(12) United States Patent
Watanabe et al.

(10) Patent No.: US 7,884,296 B2
(45) Date of Patent: Feb. 8, 2011

(54) SIDE-SURFACE LIGHT-EMITTING UNIT AND ILLUMINATED PANEL USING THE SAME

(75) Inventors: Akira Watanabe, Fujiyoshida (JP);
Kazuya Ishihara, Fujiyoshida (JP);
Kosuke Tsuchiya, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 0 days.

(21) Appl. No.: 12/280,134

(22) PCT Filed: Feb. 16, 2007

(86) PCT No.: PCT/JP2007/000093

§ 371 (c)(1),
(2), (4) Date: Aug. 20, 2008

(87) PCT Pub. No.: WO2007/097117

PCT Pub. Date: Aug. 30, 2007

(65) Prior Publication Data

US 2010/0133083 A1    Jun. 3, 2010

(30) Foreign Application Priority Data

Feb. 20, 2006  (JP) .............................. 2006-042682

(51) Int. Cl.
*H01H 9/18* (2006.01)

(52) U.S. Cl. ...................... 200/314; 200/310

(58) Field of Classification Search ................. 200/310, 200/313, 314; 341/22; 345/168–170, 176; 362/28, 30, 84, 85, 95, 29, 249.02, 253, 324
See application file for complete search history.

(56) References Cited

U.S. PATENT DOCUMENTS

| 4,124,879 A * | 11/1978 | Schoemer ..................... 362/26 |
| 6,765,503 B1 * | 7/2004 | Chan et al. ..................... 341/22 |
| 6,878,892 B2 * | 4/2005 | Miyako et al. ............... 200/310 |
| 6,997,572 B2 * | 2/2006 | Ono et al. ...................... 362/24 |

(Continued)

FOREIGN PATENT DOCUMENTS

JP         61-223 U        1/1986

(Continued)

OTHER PUBLICATIONS

Office Action issued Aug. 25, 2010 by The State Intellectual Property Office of the People's Republic of China in patent application No. CN200780010830.0.

*Primary Examiner*—Michael A Friedhofer
(74) *Attorney, Agent, or Firm*—Browdy and Neimark, PLLC

(57) ABSTRACT

The present invention is a side-surface light-emitting unit to illuminate one or more illuminated objects disposed on a flat surface to extend in one direction, from a side surface of the illuminated object and includes a light guiding body which is disposed along the side surface of the illuminated object and emits light toward the side surface of the illuminated object, and an LED disposed at at least one end of light guiding body, an upper surface and a lower surface of the light guiding body except the side surface facing the object being optically shielded. It is possible to brightly illuminate objects such as key switches or the like from one end of the arrangement along a direction of the arrangement by uninterrupted continuous emission light.

15 Claims, 7 Drawing Sheets

U.S. PATENT DOCUMENTS

| | | | |
|---|---|---|---|
| 7,357,523 B2 * | 4/2008 | Kao et al. ...................... | 362/23 |
| 7,407,316 B2 * | 8/2008 | Noh et al. ................... | 362/612 |
| 7,446,274 B2 * | 11/2008 | Choi et al. ................. | 200/310 |
| 7,651,234 B2 * | 1/2010 | Lim .......................... | 362/97.3 |
| 7,709,760 B2 * | 5/2010 | Chen et al. ................. | 200/314 |
| 2003/0184992 A1 | 10/2003 | Miyazaki | |

FOREIGN PATENT DOCUMENTS

| | | | |
|---|---|---|---|
| JP | 61-075023 U | 4/1986 | |
| JP | 61-75023 | 5/1986 | |
| JP | 02-285389 A | 11/1990 | |
| JP | 06-038127 U | 5/1994 | |
| JP | 11-006919 A | 1/1999 | |
| JP | 11006919 A | 1/1999 | |
| JP | 2002-131555 A | 5/2002 | |
| JP | 2002131555 A | 5/2002 | |
| JP | 2004-069751 A | 3/2004 | |
| JP | 2005-116428 A | 4/2005 | |
| JP | 2005-166535 A | 6/2005 | |

\* cited by examiner

SIDE-SURFACE LIGHT-EMITTING UNIT AND ILLUMINATED PANEL USING THE SAME

FIELD OF THE INVENTION

The present invention relates to a side-surface light-emitting unit to illuminate objects to be illuminated, which are arranged on a flat surface to extend in one direction, from a side surface and an illuminated panel using the side-surface light-emitting unit.

BACKGROUND ART

A large number of sheet switches such as a sheet switch 10 shown in FIG. 11 are conventionally used as key input parts provided in various electronic instruments such as mobile phones, mobile information terminal devices or the like, and have illumination function by positioning light emitting elements 6 as light sources disposed about key switches 8. On the other hand, as shown in FIG. 12, there is known a sheet switch 1 having a structure in which the light emitting elements 6 and a flat plate-like light guiding plate 5 are combined (see Patent Document 1). The sheet switch 1 includes a circuit board 2 provided with fixed contacts 3 and wiring patterns, movable contacts 4 each disposed over each of the fixed contacts 3 and further including tactile springs, a light guiding plate 5 disposed above the circuit board 2, light emitting elements 6 to illuminate one side surface of the light guiding plate 5 and key tops 7 to press the movable contacts 4 respectively, and lights emitted from the light emitting elements 6 are transmitted through the light guiding plate 5. In the sheet switch 1, all the key tops 7 are illuminated by irradiating light guided from the light emitting elements 6 to lower portions of the key tops 7 passing through the light guiding plate 5.

On the other hand, to correspond to recent thinned electronic devices, further thinned sheet switches with illumination function are known (see Patent Document 2). FIG. 13 illustrates a sectional structure of a sheet switch 11 as described in Patent Document 2. The sheet switch 11 includes a key switch 18 having a circuit board 12 provided with fixed contacts 13 and movable contacts 14 disposed over the fixed contacts 13, a light guiding plate 15 covering the key switch 18, and key tops 17 disposed in upward positions of the light guiding plate 15 where the movable contacts 14 are provided. In the sheet switch 11, the entirety of the light guiding plate 15 is lighted and the key tops 17 are illuminated from lower surfaces thereof, by irradiating light emitted from the light emitting elements 16 arranged at one end of the circuit board 12 to the side surface of the light guiding plate 15.

Patent Document 1: Japanese Patent Laid-Open No. 2004-69751 (FIG. 9)

Patent Document 2: Japanese Patent Laid-Open No. 2004-69751 (FIG. 6)

DISCLOSURE OF THE INVENTION

Problems to be Solved by the Invention

As shown in FIG. 11, in the sheet switch 10 having the structure in which light emitting elements 6 are separately disposed in a vicinity of the key switches 8, because the number of light emitting elements 6 must be increased as the number of key switches 8 increases, there is a problem that power consumption is increased and the sheet switch itself becomes large in size. In addition, in the sheet switch 1 as shown in FIG. 12, it is sufficiently possible to guide light to the key tops 7 through the light guiding plate 5 with less light emitting elements 6, but the light guiding plate 5 must have a certain thickness to guide efficiently and completely the light emitted from the fewer light emitting elements 6 from a side surface. However, when the light guiding plate 5 having a large thickness is used, because the entirety of the sheet switch 1 becomes large in thickness with the increment in thickness of the light guiding plate, there is a problem that it is no longer possible to accomplish a thinned sheet switch.

On the other hand, in the sheet switch 11 as shown in FIG. 13, because the light emitted from the light emitting elements 16 enteres one end of the light guiding plate 15 to guide the light overall, there is a problem that brightness of the key tops 17 remote from the light emitting elements 16 is reduced and the key tops have considerable variation in brightness overall. Moreover, because the light guiding plate 15 is merely positioned above the key switch 18, a gap easily occurs between the light guiding plate 15 and the key switch 18, and also, a gap easily occurs even between the end portion of the light guiding plate 15 and each light emitting element 16. If such gaps exist about the light guiding plate 15, light leaks from the gaps, and hence there is a problem that an amount of light passing through each of the key tops 17 is insufficient or variation in brightness occurs. Consequently, an illumination effect such that only the key tops 17 are intensively illuminated cannot be achieved.

Therefore, an object of the present invention is to provide a side-surface light-emitting unit capable of brightly illuminating objects, such as key switches or the like from one end of each of the objects along an arranged direction thereof by uninterrupted continuous emitted light and accomplishing a thinned structure which can be arranged even in a narrow place, and an illuminated panel including the side-surface light-emitting unit.

For Solving the Problems

To solve the aforementioned problems, a side-surface light-emitting unit according to the present invention is configured to illuminate one or more illuminated objects disposed on a flat surface to extend in one direction, from a side surface of the illuminated object and includes a light guiding body which is disposed along the side surface of the illuminated object and emits light toward the side surface of the illuminated object and at least one light source disposed at least one end of the light guiding body.

An illuminated panel according to the present invention includes a substrate, objects to be illuminated, which are disposed on the substrate to extend in one direction and side-surface light-emitting units arranged along the illuminated objects.

Effect of the Invention

In the side-surface light-emitting unit according to the present invention, it is possible to uniformly illuminate one or more illuminated objects linearly extending or arranged, from a direction of a side surface thereof, because the light guiding body is disposed along the side surface of the illuminated object. In addition, because the light source may be merely provided at least one end of the light guiding body, number of parts and installation space can be reduced.

Moreover, in the illuminated panel according to the present invention, because the side-surface light-emitting unit including the light guiding body having an elongate shape is used as an illumination device, if it is used for a sheet switch in a mobile phone or the like, it is possible to illuminate key switches along a direction of arrangement thereof by uninterrupted continuous light. Also, using the light guiding body's surfaces, which face the illuminated objects, as emission surfaces, the illuminated objects can be efficiently illuminated by light which enters one end of the light guiding body and is emitted from the emission surfaces toward the illuminated objects.

In addition, because a sheet member to protect the key switches can be mounted directly on the side-surface light-emitting unit, a spacer disclosed in conventional art, is not required. That is to say, the light guiding body serves as a spacer in the side-surface light-emitting unit, thereby the entirety of the sheet switch is thinned.

PREFERRED EMBODIMENTS FOR CARRYING OUT THE INVENTION

Preferred embodiments for carrying out a side-surface light-emitting unit according to the present invention and an illuminated panel using the side-surface light-emitting unit will be explained in detail hereinafter with reference to the accompanying drawings.

Figure 1:
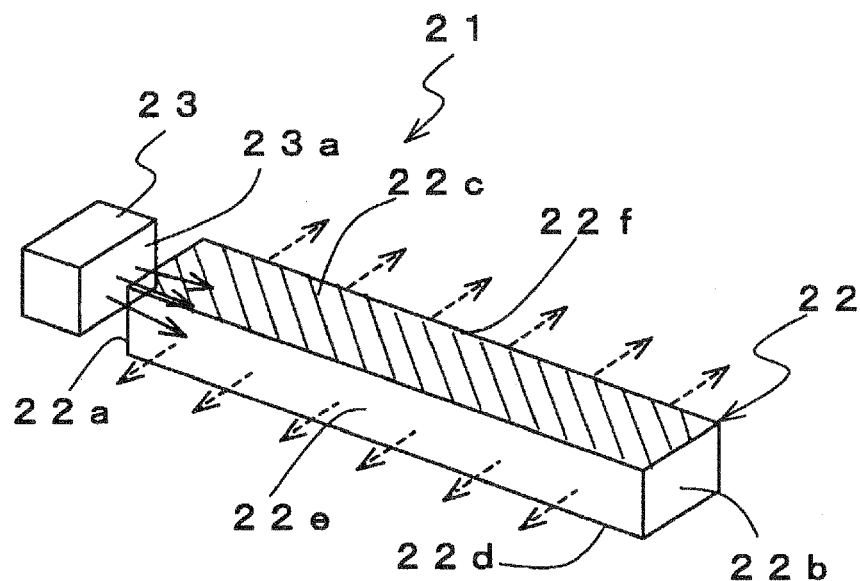
FIG. 1 is a perspective view of a side-surface light-emitting unit according to the present invention.
Figure 2:
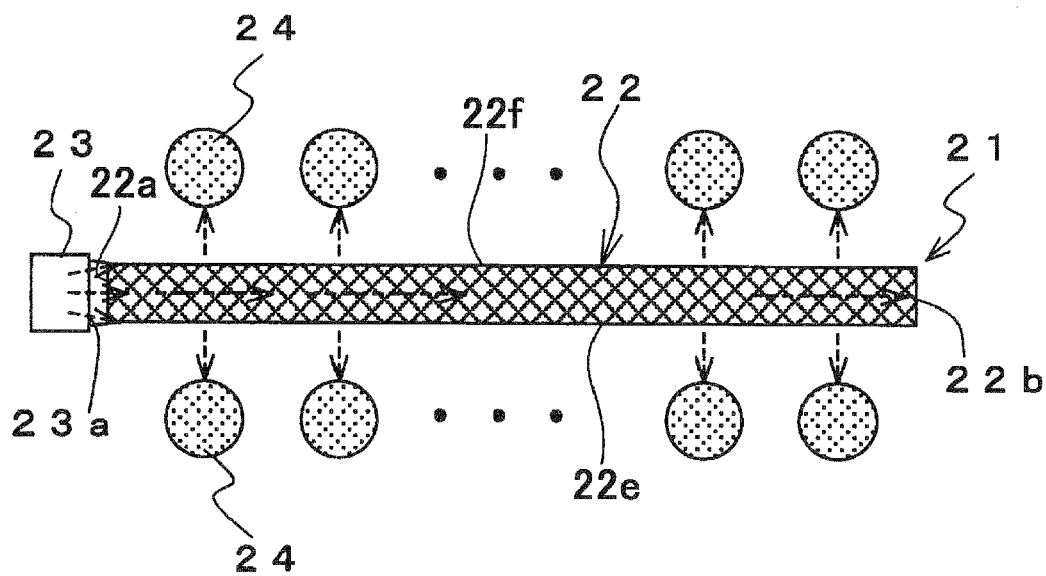
FIG. 2 is a plan view of the side surface light-emitting unit.

As shown in FIGS. 1 and 2, the side-surface light-emitting unit 21 according to the present invention is structured by a light guiding body 22 having an elongate shape, and a side-surface light-emitting type LED 23 disposed to face a light receiving surface 22a which is one of end surfaces of the light guiding body 22. The light guiding body 22 is formed in a rectangular shape in section from a material having a light transmitting property such as acrylic resin or the like. The light guiding body has upper and lower surfaces 22c, 22d and right and left side surfaces 22e, 22f, in a longitudinal direction thereof and at opposite ends thereof square end surfaces 22a, 22b. Light emitted from a light emitting surface 23a of the LED 23 is guided to the inside of the light guiding body 22 through the end surface 22a (light receiving surface) which is a light receiving side of the light guiding body 22, and emits band-shaped lights from the right and left side surfaces 22e, 22f to illuminate objects 24 because the light guiding body 22 is disposed to extend lengthwise along an arranged direction of the objects 24, as shown in FIG. 2.

Figure 3:
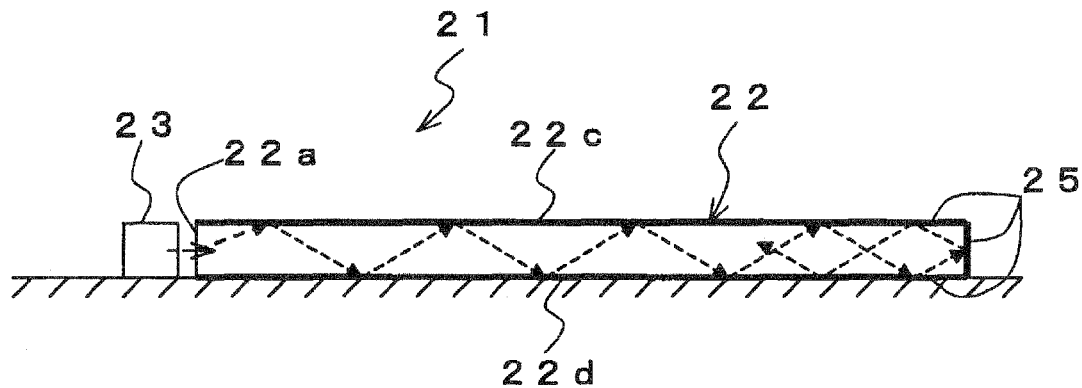
FIG. 3 is a sectional view of the side-surface light-emitting unit.

As mentioned above, because the light guiding body 22 is made of the acrylic resin having the light transmitting property, the light entering the light guiding body through the light receiving surface 22a is capable of being emitted from the upper and lower surfaces 22c, 22d, and the right and left side surfaces 22e, 22f, as well as an end surface 22b opposite to the light receiving surface 22a. Therefore, the light guiding body 22 in an embodiment is configured to emit the light from only the right and left side surfaces 22e, 22f and to have those side surfaces as emission surfaces by providing light shielding members 25 on the upper and lower surfaces 22c, 22d and on the opposite end surface 22b. The light shielding members 25 are provided for the purpose of preventing the light entering the light guiding body through the light receiving surface 22a from being emitted through the upper surface 22c and the lower surface 22d to the exterior and efficiently guiding the light to the end surface 22b by means of reflection action in the light guiding body 22, as shown in FIG. 3. Therefore, inside surfaces of the light shielding members 25, in other words, surfaces facing each of the upper and lower surfaces 22c, 22d and the opposite end surface 22b are preferably provided with a metallic sheet or metallic evaporated film having a metallic surface with a high light-reflectance. Provision of the light shielding members 25 causes the light guided in the light guiding body 22 to be emitted as uninterrupted continuous band-shaped lights from the right and left side surfaces 22e, 22f along the arranged direction of the objects 24 to be illuminated. In addition, in the embodiment, because light reflected on the end surface 22b can be guided again toward the light receiving surface 22a by optically shielding the end surface 22b of the light guiding body 22, it is possible to further increase an amount of light emitted from the both side surfaces 22e, 22f.

As examples of the objects 24 to be illuminated, goods with a large number of arranged elements, lengthy goods or the like such as key switches installed in a mobile phone, a portable information terminal device, or accessories such as finger rings for display, ear rings or necklaces are suitable for the illuminated objects. With respect to the side-surface light-emitting unit 21, a plurality of illuminated objects 24 are arranged along a direction where the light guiding body 22 extends (in a longitudinal direction) or to lengthwise extend in parallel with the light guiding body 22. The light guiding body 22 and the illuminated objects 24 are preferably disposed in the same plane so that light emitted from the both side surfaces 22e, 22f of the light guiding body 22 in a horizontal direction illuminates side surfaces of the illuminated objects 24. Meanwhile, in the embodiment, light is emitted from the both side surfaces 22e, 22f of the light guiding body 22, but if the illuminated objects 24 are arranged to face only one side surface of the light guiding body 22 in line, only the first side surface along which the illuminated objects 24 are arranged acts as the emission surface of the light guiding body and a light shielding member 25 similar to the aforementioned light shielding member is provided on a second side surface opposite the first side surface, thereby an amount of light emitted from the first side surface to the illuminated objects 24 can be further increased.

Figure 4:
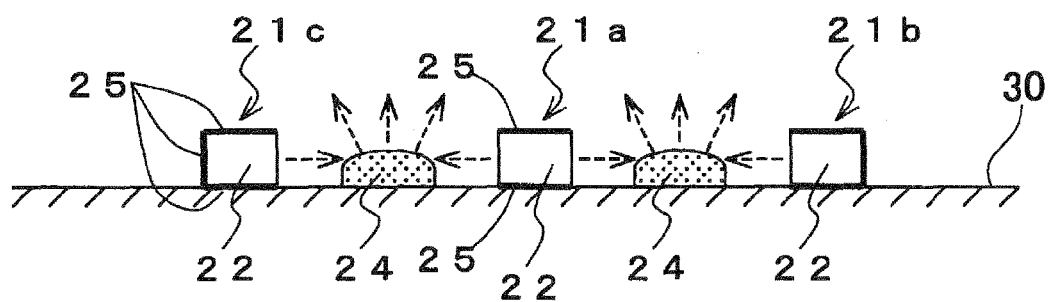
FIG. 4 is a sectional view showing a first configuration example of the side-surface light-emitting unit.

FIG. 4 illustrates a configuration example of a case where a plurality of side-surface light-emitting units 21 as mentioned above are arranged. In the configuration example, illuminated objects 24 are arranged in two rows on a flat surface 30 and side-surface light-emitting units 21a, 21b and 21c, one of which is positioned on a central portion and two of which are positioned on both sides, are disposed in three rows on the same flat surface so that one illuminated object 24 is sandwiched between the central side-surface light-emitting unit and one or the other of the side-surface light-emitting units at the both sides. A light guiding body 22 of the first side-surface light-emitting unit 21a which is positioned on the central portion is provided with right and left side surfaces as emission surfaces by providing light shielding members 25 on an upper surface and a lower surface thereof, while light guiding bodies 22 of the second and third side-surface light-emitting units 21b and 21c which are positioned to face the both sides of the illuminated objects is provided with one side surface facing the illuminated objects as an emission surface by providing shielding members 25 on other outer side surfaces as well as on the upper surface and the lower surface. In this configuration example, because continuous band-shaped lights along the illuminated objects 24 of the rows is emitted horizontally from the right and left side surfaces of each light guiding body 22, illumination effects such as high brightness and even light-emission can be obtained.

Figure 5:
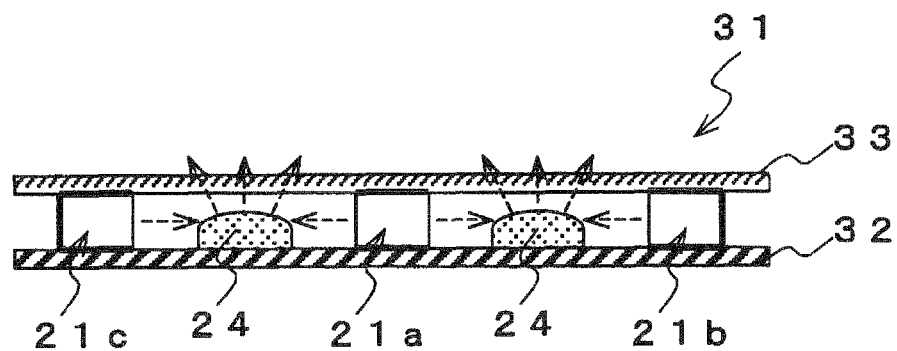
FIG. 5 is a sectional view of an illuminated panel according to the present invention.

FIG. 5 illustrates an illuminated panel 31 including a plurality of side-surface light-emitting units 21a, 21b and 21c disposed on a substrate 32 and a light-transmitting sheet member 33 covering the side-surface light-emitting units. In the illuminated panel 31 having such a structure, because opposite side surfaces of each of the illuminated objects 24 are sandwiched by the side-surface light-emitting units 21a, 21b and 21c, and the upper and lower surfaces of the side-surface light-emitting units are sandwiched by the substrate 32 and the sheet member 33, it is possible to assemble the illuminated panel as an integral structure having airtightness in side of a package. Meanwhile, the upper and lower surfaces of the side-surface light-emitting units 21a, 21b and 21c are shielded by the sheet member 33 and the substrate 32, respectively.

The illuminated panel 31 in the aforementioned embodiment can be disposed at a position where a flat illumination or assembling is desired to be obtained in an electronic device or the like. In addition, it is possible to use the illuminated panel as an independent illumination device by integrally forming a light source such as an LED with the light receiving surface 22a of each light guiding body 22 and installing a power source such as a lithium battery, small rechargeable battery or the like which drives the LED in the illuminated panel.

Figure 6:
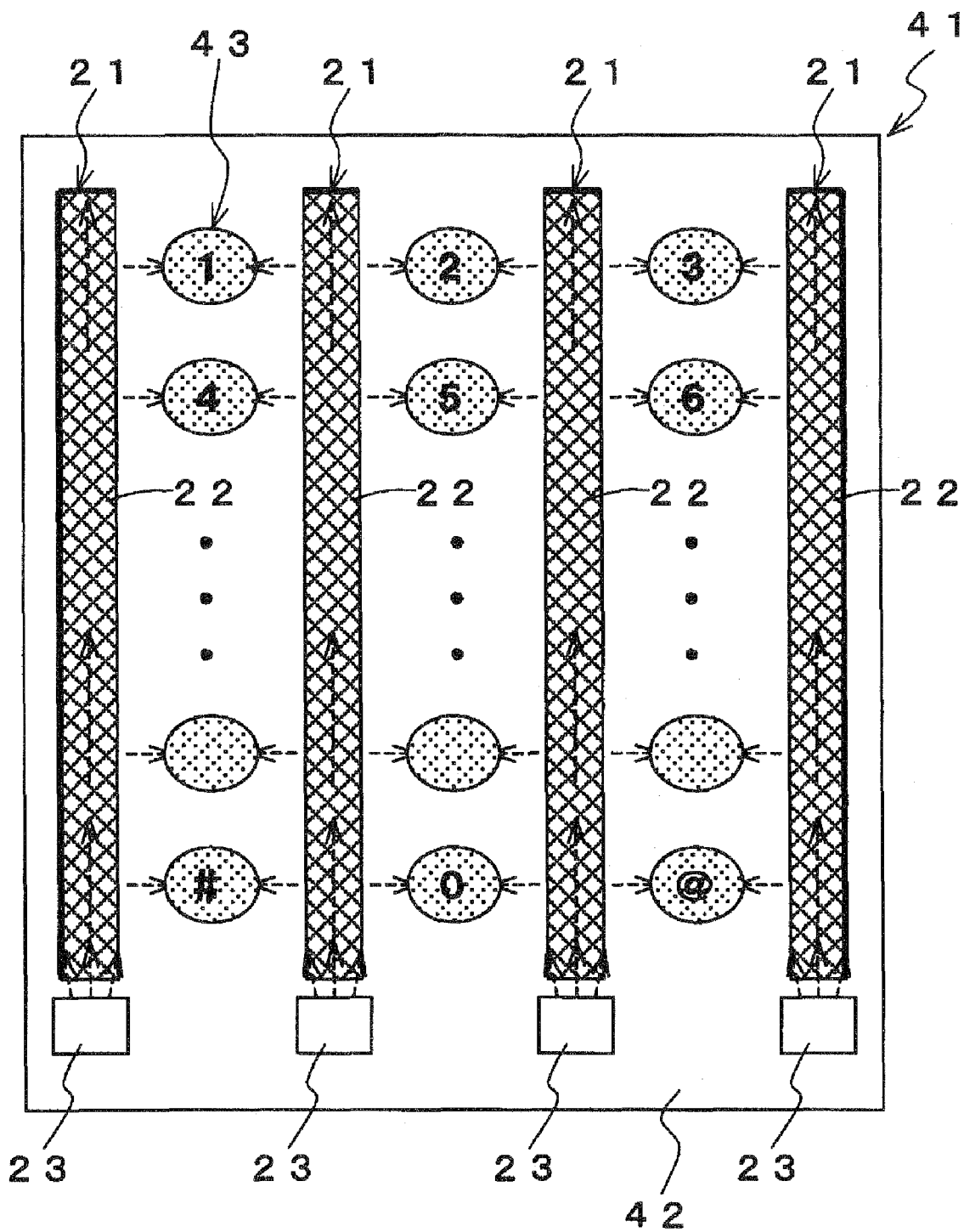
FIG. 6 is a plan view showing one embodiment of an illuminated sheet switch to which the illuminated panel is applied.
Figure 7:
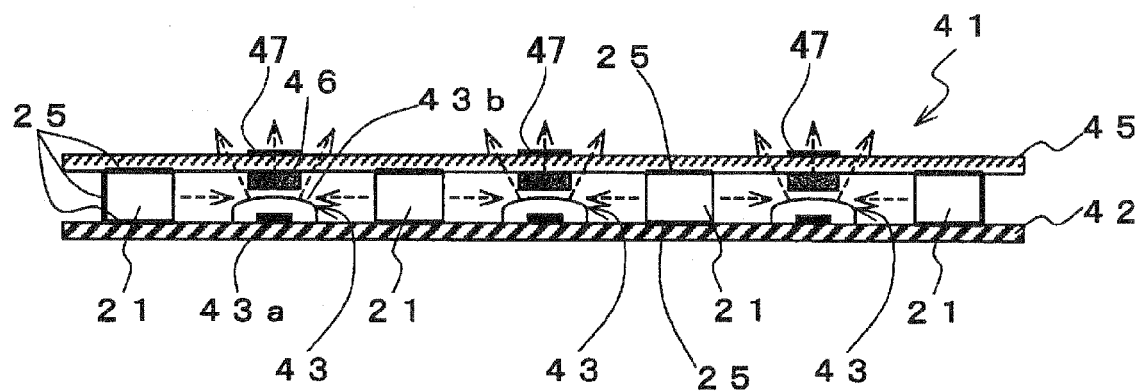
FIG. 7 is a sectional view of the illuminated sheet switch.

Next, an embodiment of an illuminated sheet switch 41 which is installed in a mobile phone or the like as an application example of the illuminated panel 31 is described. As shown in FIGS. 6 and 7, the illuminated sheet switch 41 is installed in a key input part of the mobile phone or the like and includes a circuit board 42, key switches 43 arranged on the circuit board 42, a sheet member 45 disposed above the key switches 43, and a plurality of side-surface light-emitting units 21 disposed to extend lengthways along an arranged direction of the key switches 43.

The circuit board 42 is made of a resin material such as glass epoxy or flexible base material (FPC) or the like and is provided at a surface with the key switches 43, electrodes to mount LEDs 23, and wiring patterns extending from the electrodes. The key switches 43 comprise a plurality of number input keys and a plurality of symbol input keys, which are arranged on the circuit board 42 at predetermined intervals in longitudinal and lateral directions. Each of the key switches is composed of a fixed contact 43a and a movable contact 43b of a semi-spherical tactile spring covering the fixed contact 43a. The LEDs 23 are mounted on the circuit board 42 by connecting a pair of element electrodes (an anode electrode and a cathode electrode) provided on a lower surface of each of the LEDs 23 to electrodes provided on the circuit board 42. The sheet member 45 is formed by a sheet-like resin material such as polyimide, polycarbonate or the like or thin silicone rubber or the like and placed and supported on light guiding bodies 22 to cover the key switches 43. Moreover, the sheet member 45 has a light transmitting property and display parts 47 such as numbers, symbols on positions corresponding to key switches 43 and the display parts 47 are formed by printing, stamping or the like, and also the sheet member includes pressing protrusions 46 disposed to face the movable contacts 43b.

Each of the side-surface light-emitting units 21 is disposed between the rows of the key switches 43 arranged on the circuit board 42. As shown in FIG. 6, in the illuminated sheet switch 41 in the embodiment, because the plurality of key switches 43 are arranged in the longitudinal direction, the side-surface light-emitting units 21 are longitudinally disposed among the key switches 43 which are longitudinally arranged. Note that in the embodiment, because the key switches 43 are longitudinally disposed in three rows, the side-surface light-emitting units 21 are configured to have a structure in which a pair of opposite side-surface light-emitting units disposed outside and a pair of opposite side-surface light-emitting units are disposed inside the light-emitting units disposed outside and arranged to be in four rows in total. The light guiding bodies 22 constituting the side-surface light-emitting units 21 are disposed in accordance with the number of the longitudinally arranged key switches 43. In addition, the light guiding body 22 is set to have a slightly larger thickness than that of the movable contact 43b. The formation of each light guiding body 22 having such a thickness causes the key switches 43 to be brightly illuminated from the side surfaces by light emitted from the light guiding bodies 22 and the light guiding bodies can have a function as spacers maintaining a gap between the circuit board 42 and the sheet member 45, when the light guiding bodies 22 and the key switches 43 are disposed on the circuit board 42. Accordingly, it is not required to provide exclusive spacer members that are constituent elements in a conventional sheet switch.

Each of the light guiding bodies 22 is provided with an emission surface on side surfaces facing the key switches 43 and light shielding members 25 on other surfaces than the side surfaces, while the light shielding members 25 are provided also on outer side surfaces of the right and left pair of light guiding bodies 22 which are disposed outside and each have an outer side surface which does not face the key switches 43. The sheet member 45 is formed in approximately the same size as the circuit board 42 and placed on upper surfaces of the light guiding bodies 22 so that each of the pressing protrusions 46 provided on the lower surface thereof is positioned just above the corresponding key switch 43. Since the sheet member 45 which is supported on the upper surfaces of the light guiding bodies 22, the sheet member 45 is maintained in approximately a horizontal state. Therefore, in a normal state, a slight gap is provided between each pressing protrusion and the corresponding movable contact and the pressing protrusions 46 provided on the lower surface of the sheet member are not in contact with the movable contacts 43b or do not press them. However, when a display part 47 of the sheet member 45 is pressed from above, the corresponding pressing protrusion 46 presses the corresponding movable contact 43b, thereby the movable contacts 43b is deflected downwardly to be in contact with the corresponding fixed contact 43a, whereby accomplishing a state of electrical conduction. In addition, when a finger releases the pressing of the display part 47 on the sheet member 45, the movable contact 43b is resiliently returned to be in a former position away from the fixed contact 43a, and thus, the electrical conduction is disconnected.

Next, illumination operation of the illuminated sheet switch 41 as mentioned above is described with reference to FIGS. 6 and 7. A current is supplied from a mother board or the like to each of the LEDs 23 through connectors (not shown) provided on the circuit board 42. Light emitted from the light emitting surface of each LED 23 directly enters the light receiving surface 22a of each light guiding body 22. The light entering the light guiding body 22 through the light receiving surface 22a is guided toward the opposite end surface 22b passing through the light guiding body 22. In the light guiding body 22, light traveling straight ahead from the light receiving surface 22a, light traveling in the light guiding body while being reflected on the light shielding member 25 provided on at least one of the upper and lower surfaces and a side surface, and reflected light which travels in an opposite direction of the aforementioned light-traveling direction after being reflected on the end surface 22b of the light guiding body 22 are in a mixed state. Thus, the light guided in the light guiding body 22 is emitted from the side surfaces which are emission surfaces of the light guiding body 22, generally in parallel with the circuit board 42. Because the light guiding bodies 22 are arranged among the rows of the key switches 43, the right and left side surfaces of each of the key switches 43 can be illuminated. In addition, because the fixed contacts 43a and the movable contacts 43b which constitute the key switches 43 are respectively made of metallic members, light irradiated to both side surfaces of the key switches are reflected on the side surfaces upwardly, passes through the sheet member 45 and brightly illuminate above the key switches.

Because each of the aforementioned side-surface light-emitting units 21 has a thin elongate light guiding body 22 and the LED 23 provided at one end of the light guiding body 22, the side-surface light-emitting units can comfortably be disposed among the rows of the arranged key switches 43 and also serve as the conventional spacers. Therefore, it is possible to increase illumination brightness of the key switches 43, compared to a conventional sheet switch in which a large number of LEDs are arranged, or a conventional sheet switch in which light guiding bodies are disposed on the surface of the sheet switch, and reduce a flat surface size or thickness of the unit or panel more than a conventional article. Moreover, it is possible to appropriately change the arrangements of the number and size of the side-surface light-emitting units 21 to suit an arrangement of key switches, which differ according to a model of mobile phone in which the side-surface light-emitting units are to be installed. Furthermore, by adding a small power source unit supplying power to the LED 23 of the side-surface light-emitting unit 21, it is possible to use the side-surface light-emitting unit as an independent illumination device in which power from the circuit board 42 is not required. By making an independent structure including such a power source, the side-surface light-emitting unit can later be separately installed in a sheet switch having no illumination function.

Figure 8:
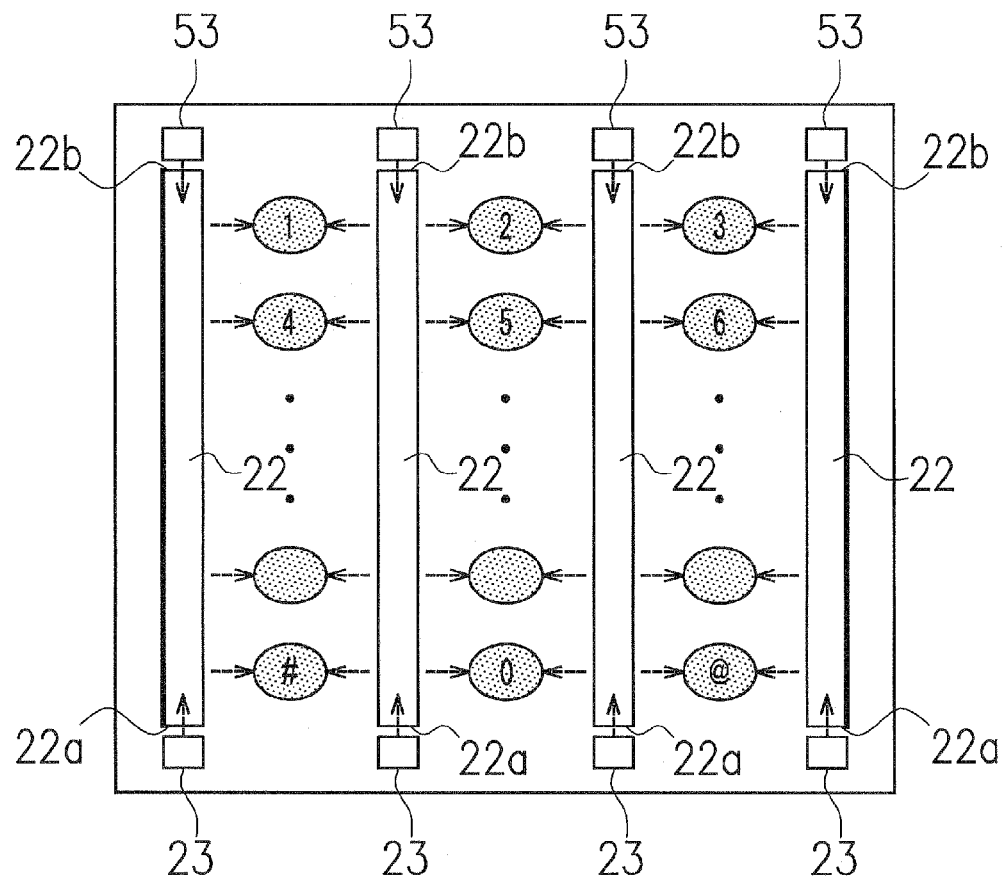
FIG. 8 is a plan view showing an embodiment of an illuminated sheet switch in which LEDs are arranged at opposite sides of a light guiding body.

FIG. 8 illustrates another embodiment of the illuminated sheet switch 41 as shown in FIGS. 6 and 7, in which LEDs 53 are also arranged close to the end surface 22b opposite to the light receiving surface 22a of the light guiding body 22, and the input of light emitted from the LEDs may be entered into the light guiding body through both ends of the light guiding body. The LEDs 23, 53 disposed close to the opposite ends of the light guiding body 22 may have the same emission colors or a combination of different emission colors. In the case of same emission colors, stronger light can be emitted from the light guiding body 22. In the case of a combination of different emission colors, light of a mixed emission color can be emitted, and additionally, by switching light-emission from LEDs or adjusting emission time, multi-color light can be emitted.

Figure 9:
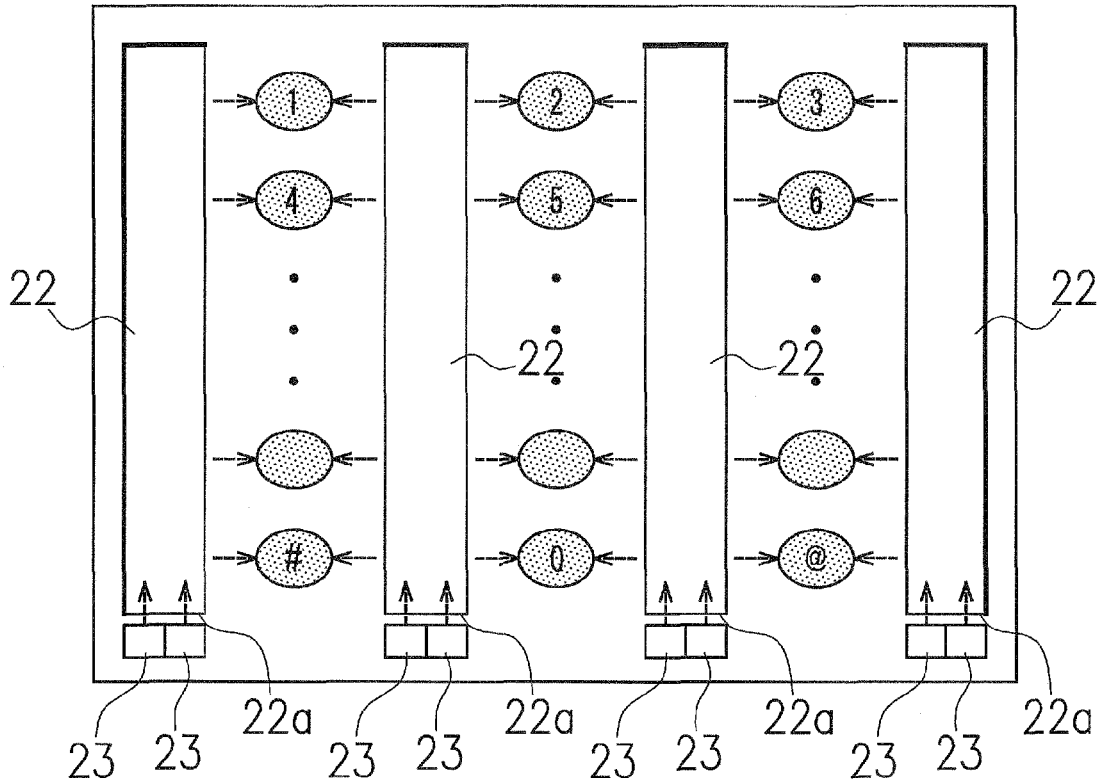
FIG. 9 is a plan view showing an embodiment of an illuminated sheet switch in which a plurality of LEDs are arranged at one end of the light guiding body.

FIG. 9 illustrates an embodiment of an illuminated sheet switch in which two LEDs 23, 23 are disposed to face a side of the light receiving surface 22a of the light guiding body 22. The two LEDs 23, 23 may have the same emission color or different emission colors, similarly to the aforementioned embodiments.

Figure 10:
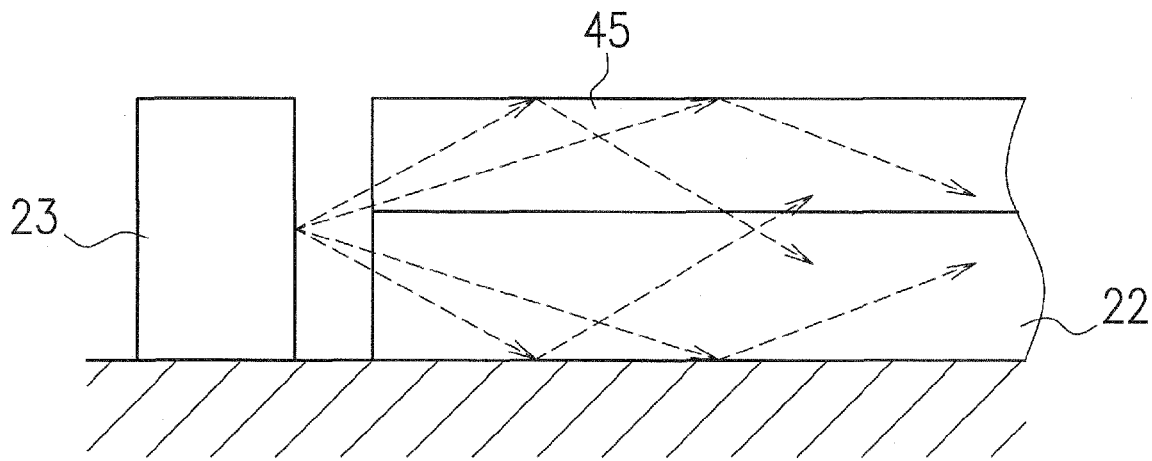
FIG. 10 is a sectional view showing an embodiment capable of introducing light from an LED into both the light guiding body and a sheet member.
Figure 11:
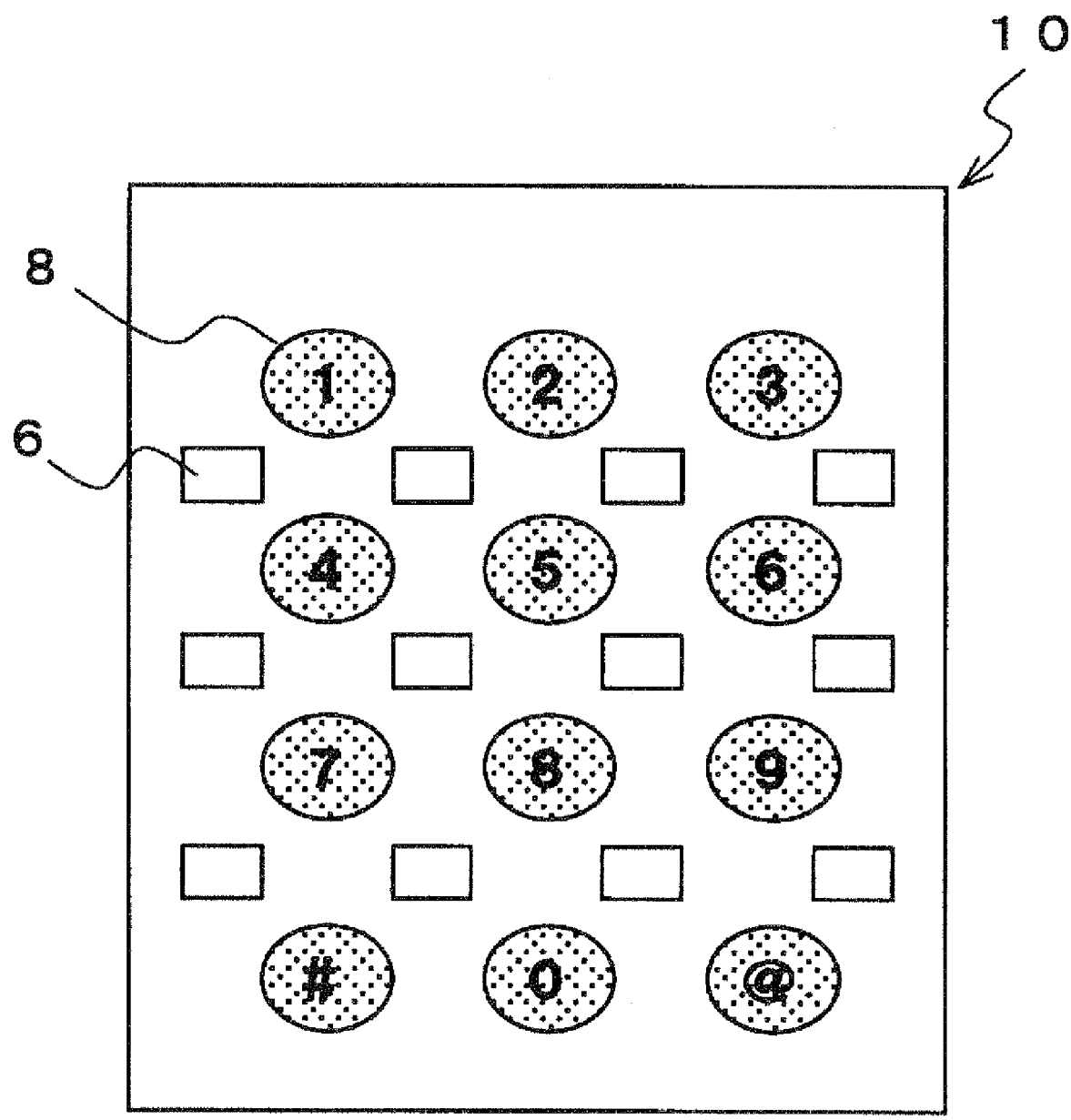
FIG. 11 is a plan view of a conventional sheet switch in which a plurality of light sources are arranged.
Figure 12:
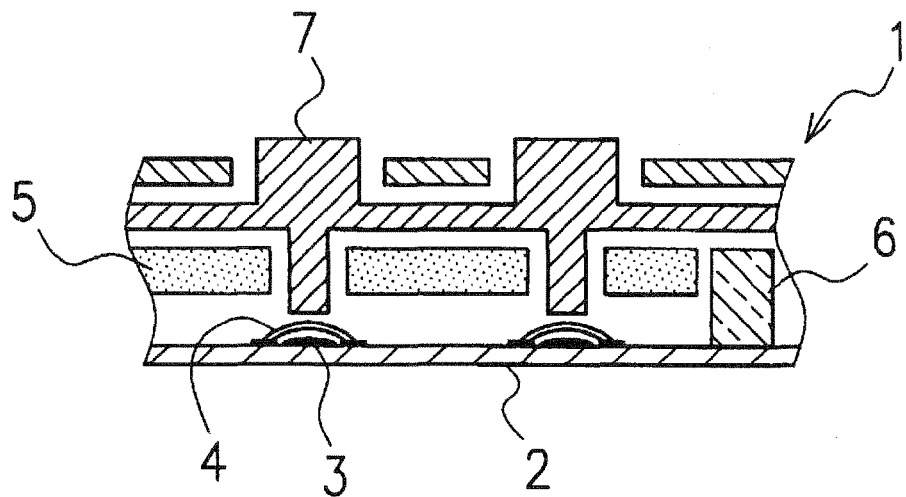
FIG. 12 is a sectional view of a conventional sheet switch including a plurality of light sources and a plurality of light guiding plates.
Figure 13:
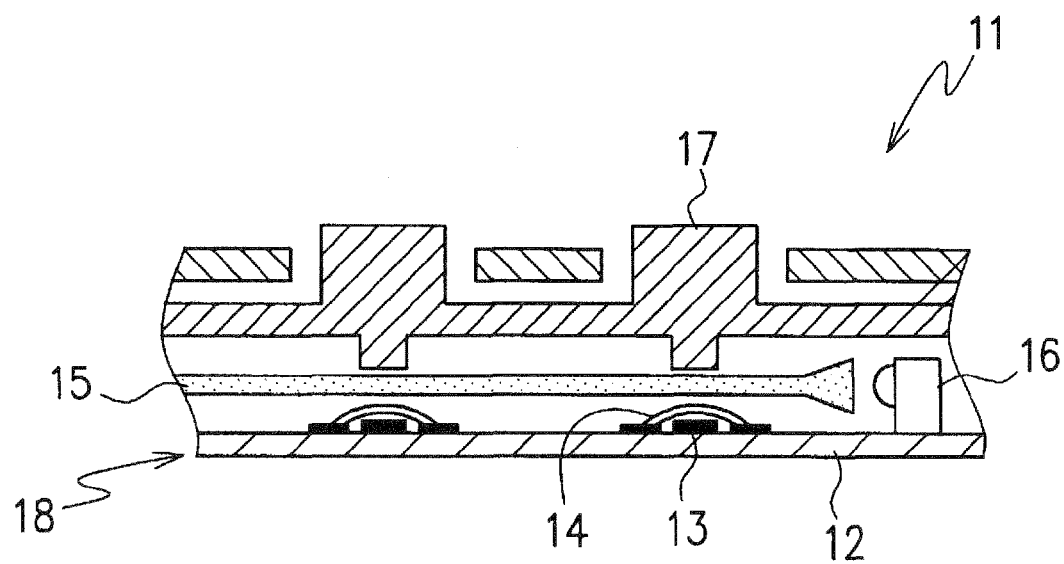
FIG. 13 is a sectional view of a conventional sheet switch in which a light source is disposed at one end of a light guiding plate.

FIG. 10 illustrates an embodiment in which an LED 23 having approximately a same height as the total thickness of the light guiding body 22 and the sheet member 45 which covers the light guiding body and light emitted from a light emitting surface 23a of the LED 23 which face not only the light guiding body 22, but also the sheet member 45. Because the sheet member 45 also has a light guiding property, the light guided in the sheet member 45 also enters the light guiding body 22, and because the light emitted from the LED 23 efficiently enters the sheet member and the light guiding body, and therefore, brighter light can be guided.

INDUSTRIAL APPLICABILITY

The side-surface light-emitting unit according to the present invention is useful for illumination of a mobile phone or mobile information terminal device or the like in which a plurality of key switches are arranged.

DESCRIPTION OF REFERENCE NUMBERS

21 side-surface light-emitting unit
22 light guiding body
22a light receiving surface
22b end surface
22c upper surface
22d lower surface
22e right side surface
22f left side surface
23 LED (light-emitting diode)
23a light emitting surface
24 illuminated object
25 light shielding member
31 illuminated panel
32 substrate
33 sheet member
41 illuminated sheet switch
42 circuit board
43 key switch
43a fixed contact
43b movable contact
45 sheet member
46 pressing protrusion
47 display part
53 LED

The invention claimed is:
1. A side-surface light-emitting unit comprising:
a light guiding body which is disposed along side surfaces of one or more key switches and is configured to emit light toward the side surfaces of the one or more key switches which are disposed to extend in a direction;

at least one light source each including a light emitting surface disposed to face a light receiving surface which is at least one end of the light guiding body, and a sheet member covering the one or more key switches, the light guiding body having an elongate shape of a rectangular shape in section, the light emitting surface of the at least one light source and the light receiving surface of the light guiding body having substantially a same size, the light guiding body including an emission surface provided on at least one side surface facing the key switches, at least upper and lower surfaces of the light guiding body being optically shielded, the sheet member being supported on the upper surface of the light guiding body.

2. The side-surface light-emitting unit according to claim 1, wherein the light guiding body is disposed on a same flat surface as that on which the key switches are disposed.

3. The side-surface light-emitting unit according to claim 1, wherein the at least upper and lower surfaces of the light guiding body are optically shielded by light shielding members having reflection surfaces at inner sides.

4. The side-surface light-emitting unit according to claim 1, wherein the light emitting surface of the at least one light source is disposed to face both of an end surface of the light guiding body and an end surface of the sheet member, wherein the light source is a side-surface light-emitting-type light-emitting diode.

5. The side-surface light-emitting unit according to claim 1, wherein light receiving surfaces are provided at both ends of the at least one light guiding body, wherein at least one light source is disposed to face each of the light receiving surfaces of the both ends of the at least one light guiding body.

6. The side-surface light-emitting unit according to claim 5, wherein each of the light sources emits light of a same color.

7. The side-surface light-emitting unit according to claim 5, wherein at least one of the light sources emits light of a different color to light emitted by other of the light sources.

8. The side-surface light-emitting unit according to claim 1, wherein a plurality of light sources are disposed to face the light receiving surface which is at least one end of the at least one light guiding body.

9. The side-surface light-emitting unit according to claim 8, wherein each of the light sources emits light of a same color.

10. The side-surface light-emitting unit according to claim 8, wherein at least one of the light sources emits light of a different color to light emitted by other of the light sources.

11. An illuminated panel, comprising:

a substrate;

key switches disposed on the substrate to extend in one direction;

a plurality of light guiding bodies which are disposed along side surfaces of the key switches and configured to emit light toward the side surfaces of the key switches; and at least one light source including a light emitting surface disposed to face a light receiving surface which is at least one end of each of the at least one light guiding body, the at least one light guiding body each having an elongate rectangular shape in section, the light emitting surface of the at least one light source and the light receiving surface of the light guiding body having substantially a same size, each of the at least one light guiding body including at least one emission surface on at least one side surface facing each of the key switches, at least upper and lower surfaces of each of the at least one of the light guiding body being optically shielded.

12. The illuminated panel according to claim 11, wherein the plurality of key switches are arranged in at least two rows, and;

the light guiding body extending lengthwise is disposed between the two rows of the adjacent key switches.

13. The illuminated panel according to claim 11, further comprising a sheet member disposed to cover the at least one of the light guiding body and disposed on the substrate, wherein the sheet member is supported on at least one upper surface of the at least one light guiding body.

14. The illuminated panel according to claim 11, wherein the at least upper and lower surfaces of each of the at least one light guiding body are covered by light shielding members having reflection surfaces at inner sides.

15. The illuminated panel according to claim 11, wherein a light emitting surface of the at least one light source each is disposed to face both of an end surface of the light guiding body and an end surface of the sheet member, wherein the light source is a side-surface light-emitting-type light-emitting diode.

* * * * *